(12) United States Patent
Swift et al.

(10) Patent No.: US 8,440,342 B2
(45) Date of Patent: May 14, 2013

(54) THERMAL BATTERY CATHODE MATERIALS AND BATTERIES INCLUDING SAME

(75) Inventors: Geoffrey Swift, Joplin, MO (US); Charles Lamb, Carthage, MO (US)

(73) Assignee: Eaglepicher Technologies, LLC, Joplin, MO (US)

( * ) Notice: Subject to any disclaimer, the term of this patent is extended or adjusted under 35 U.S.C. 154(b) by 226 days.

(21) Appl. No.: 12/754,417

(22) Filed: Apr. 5, 2010

(65) Prior Publication Data

US 2010/0308253 A1    Dec. 9, 2010

Related U.S. Application Data

(60) Provisional application No. 61/167,042, filed on Apr. 6, 2009.

(51) Int. Cl.
H01M 6/36    (2006.01)
H01M 4/48    (2010.01)

(52) U.S. Cl.
USPC .......... 429/112; 429/218.1; 252/62.2

(58) Field of Classification Search .............. 429/112, 429/218.1; 252/62.2
See application file for complete search history.

(56) References Cited

U.S. PATENT DOCUMENTS

| | | | |
|---|---|---|---|
| 3,898,096 A | 8/1975 | Heredy et al. | |
| 3,992,222 A | 11/1976 | Walsh et al. | |
| 4,259,415 A | 3/1981 | Tamura et al. | |
| 4,608,324 A * | 8/1986 | Fujii et al. | 429/329 |
| 4,728,590 A | 3/1988 | Redey | |
| 4,954,403 A * | 9/1990 | Plichta et al. | 429/103 |
| 5,180,642 A | 1/1993 | Weiss et al. | |
| H1335 H | 7/1994 | Plichta et al. | |
| 5,534,367 A | 7/1996 | Kaun | |
| 5,667,916 A | 9/1997 | Ebel et al. | |
| 5,696,437 A | 12/1997 | Panther et al. | |
| 5,736,275 A | 4/1998 | Kaun | |
| 6,465,129 B1 | 10/2002 | Xu et al. | |
| 6,580,908 B1 * | 6/2003 | Kroll et al. | 455/435.1 |
| 6,936,379 B2 | 8/2005 | Gan et al. | |
| 7,476,467 B2 | 1/2009 | Park et al. | |
| 2003/0082452 A1 | 5/2003 | Ueda et al. | |
| 2003/0228520 A1 * | 12/2003 | Kaun | 429/247 |
| 2005/0003269 A1 | 1/2005 | Nanjundaswamy et al. | |
| 2005/0048370 A1 * | 3/2005 | Guidotti et al. | 429/221 |
| 2005/0102005 A1 | 5/2005 | Krig et al. | |
| 2005/0227146 A1 | 10/2005 | Ghantous et al. | |
| 2007/0077488 A1 | 4/2007 | Chen et al. | |
| 2007/0099080 A1 * | 5/2007 | Pickett et al. | 429/188 |
| 2007/0292748 A1 | 12/2007 | Dekel et al. | |
| 2008/0090138 A1 | 4/2008 | Vu et al. | |
| 2008/0182170 A1 | 7/2008 | Rong et al. | |
| 2008/0299447 A1 | 12/2008 | Fujiwara | |
| 2010/0310917 A1 | 12/2010 | Swift et al. | |

FOREIGN PATENT DOCUMENTS

| | | |
|---|---|---|
| EP | 1207568 A2 | 5/2002 |
| EP | 1 295 851 A1 | 3/2003 |
| JP | 61135056 A * | 6/1986 |
| JP | 2061962 A | 3/1990 |
| JP | 2267861 A | 11/1990 |
| WO | 2005060026 A2 | 6/2005 |
| WO | 2009014845 A2 | 1/2009 |

OTHER PUBLICATIONS

International Search Report and Written Opinion for International Application No. PCT/US2009/063716, dated Jan. 28, 2010, 15 pages.
International Search Report and Written Opinion for International Application No. PCT/US2010/029984, dated May 25, 2010, 13 pages.
International Search Report and Written Opinion for International Application No. PCT/US2010/029980, dated Jun. 1, 2010, 15 pages.
International Search Report and Written Opinion for International Application No. PCT/US2010/026408, dated May 10, 2010, 13 pages.
International Search Report and Written Opinion for International Application No. PCT/US2010/027612 mailed Jul. 27, 2010, 12 pages.
Sep. 14, 2012 Office Action issued in U.S. Appl. No. 12/614,667.
Sep. 24, 2012 Office Action issued in U.S. Appl. No. 12/725,872.
Aug. 29, 2012 Office Action issued in U.S. Appl. No. 12/754,405.
Sep. 20, 2011 International Preliminary Report on Patentability issued in Application No. PCT/US2010/027612.
Hiroi et al., "Effective conductivities of FeS positives in LiCl-LiBr-LiF electrolyte at different states of charge", J. of Applied Electrochemistry 16 (1986), pp. 309-311.
Masset et al., "Retained molten salt electrolytes in thermal batteries", Journal of Power Sources 139 (Available online Sep. 8, 2004), pp. 356-365.
Oct. 24, 2011 European Search Report issued in European Patent Application No. 11171301.2-2119.
U.S. Appl. No. 12/754,405, filed Apr. 5, 2010 in the name of Swift et al.
U.S. Appl. No. 12/614,667, filed Nov. 9, 2009 in the name of Chang et al.
U.S. Appl. No. 12/718,743, filed Mar. 5, 2010 in the name of Miller et al.
U.S. Appl. No. 13/161,614, filed Jun. 16, 2011 in the name of Swift et al.
U.S. Appl. No. 12/725,872, filed Mar. 17, 2010 in the name of Zi-Iang et al.
U.S. Appl. No. 61/112,562, filed Nov. 7, 2008 in the name of Chang et al.
Oct. 16, 2012 Office Action issued in European Patent Application No. 09 752 072.0.
Jan. 10, 2013 Office Action issued in U.S. Appl. No. 12/725,872.

* cited by examiner

*Primary Examiner* — Gregg Cantelmo
(74) *Attorney, Agent, or Firm* — Oliff & Berridge, PLC (57) ABSTRACT

Cathode materials for use in thermal batteries are disclosed. The cathode material includes a primary active material and an amount of a bi-metal sulfide such as $CuFeS_2$. Batteries (e.g., thermal batteries) that contain such cathode materials are also disclosed.

19 Claims, 7 Drawing Sheets

THERMAL BATTERY CATHODE MATERIALS AND BATTERIES INCLUDING SAME

CROSS-REFERENCE TO RELATED APPLICATION

This application claims the benefit of U.S. Provisional Application No. 61/167,042, filed Apr. 6, 2009, which is incorporated by reference herein in its entirety.

BACKGROUND

The field of this disclosure generally relates to cathode material for use in thermal batteries and, particularly, to cathode material that includes a primary active material and an amount of a bi-metal sulfide such as, for example, $CuFeS_2$. The disclosure also relates to batteries (e.g., thermal batteries) that contain such cathode materials.

Thermal batteries tend to have relatively long shelf lives, high energy densities, require relatively low maintenance, and can withstand relatively high temperatures. Thermal batteries also tend to provide a short burst of power over a relatively short period of time. The burst may range from less than a second to an hour or more, with power typically ranging from about a watt or less to kilowatts. Such properties make thermal batteries suitable for military (e.g., batteries for missile guidance systems) and space exploration applications. Thermal batteries may also be used in other applications, such as in electric vehicles.

A typical thermal battery includes an anode, a cathode, an electrolyte-separator containing a solid electrolyte that is non-conductive at ambient temperature, and a pyrotechnic material (e.g., heat pellet as in FIG. 1 which may contain, for example, Fe—$KClO_4$ powder) that provides a heat source to the battery. When battery operation is desired, an external stimulus is applied to the battery. For example, an electrical current may be applied to the battery to set off an electric match or an electro-active squib or a mechanical force (e.g., mechanical shock) may be applied to set off a concussion primer. The external stimulus causes the pyrotechnic material to ignite and begin to heat. Heat produced from the pyrotechnic material causes the previously solid electrolyte to melt and become conductive, which allows the battery to provide power for a desired application.

Thermal batteries are often formed using pellet techniques, such that each of the electrolyte, cathode, and heat source are formed into a wafer. In this case, the respective cell component chemicals are processed into powders and the powders are pressed together to form the cell. Each component may be formed as a discrete part, or the anode and/or cathode may include (i.e., be flooded with) electrolyte material to improve the conductivity of the cell.

The anodes of thermal batteries are generally formed of an alkali or alkaline earth metal or alloy. A typical anode includes lithium metal or a lithium alloy, such as lithium aluminum, lithium silicon, or lithium boron.

Electrolytes for use with thermal batteries often include a eutectic mixture (i.e., a mixture which solidifies at a temperature lower than each of the individual components) of lithium chloride and potassium chloride and a binder, such as MgO, fumed silica or clay minerals such as kaolinite (including kaolin clays which are known to be rich in kaolinite), which assists in containing the electrolyte within the thermal battery assembly such as by capillary action, surface tension, or both. The electrolyte-separator is often composed of binary or ternary salts melting at temperatures above ambient between 200° C. and 600° C. With typical thermal battery electrolytes, without sufficient binder, the electrolyte material may disperse throughout the battery, causing undesired shunts or short circuits in the cell.

Cathode material for thermal batteries may vary in accordance with a variety of design parameters and generally includes a metal oxide or metal sulfide. By way of example, iron oxide, iron disulfide or cobalt disulfide are often used as cathode material.

Typical thermal batteries make use of what is essentially a monolithic cathode material. While the cathode may contain components other than active cathode material such as, for example, the electrolyte to provide flooding and a lithiation additive (i.e., a lithium compound other than a lithium salt) to control voltage, conventionally there is only one active material such as, for example, a metal oxide (e.g., $FeO_4$) or metal sulfide (e.g., $CoS_2$ or $FeS_2$). Some research has been performed on incorporating additives of other sulfides to provide improved performance, such as Walsh et al. in U.S. Pat. No. 3,992,222, who examined $FeS_2$ cathodes incorporating a second sulfide as an additive to result in improved performance. The sulfides that were examined, however, were limited to single metal sulfides, such as titanium disulfide, nickel sulfide, or cerium sulfide.

A continuing need therefore exists for cathode materials that contain additives that result in improvements in conductivity, voltage and lifetime. A continuing need also exists for thermal batteries that incorporate such cathode materials and that exhibit such improved performance.

SUMMARY

The present disclosure provides improved cathode material for use in thermal batteries and batteries including the material. Cathodes in accordance with the present disclosure and batteries containing such cathodes are generally characterized by enhanced conductivity, increased voltage, and/or longer lifetime as compared to conventional cathodes and batteries.

In one aspect of the present disclosure, a cathode material for use in thermal batteries includes at least one of a metal sulfide and a metal oxide. The cathode material also includes a bi-metal sulfide.

In another aspect of the present disclosure, a battery includes anode material, cathode material, and electrolyte material. The cathode material contains at least one of a metal sulfide and a metal oxide. The cathode material also contains a bi-metal sulfide.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

A more complete understanding of the present disclosure may be derived by referring to the detailed description and claims, considered in connection with the figures, wherein like reference numbers refer to similar elements throughout the figures, and:

Corresponding reference characters indicate corresponding parts throughout the drawings. It should be noted that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION

Figure 1:
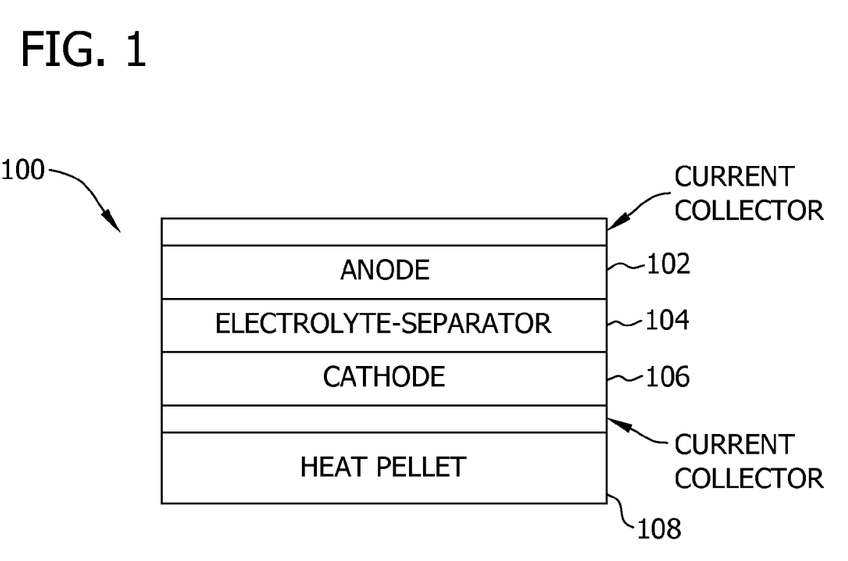
FIG. 1 illustrates an electrochemical device in accordance with various embodiments of the present disclosure.

The present disclosure generally relates to improved thermal battery cathode formulations and to batteries including the cathode material. FIG. 1 illustrates a thermal battery 100 that has an exemplary configuration suitable for use in thermal batteries of the present disclosure. The thermal battery includes an anode 102, an electrolyte-separator (electrolyte) 104, and a cathode 106. In accordance with the present disclosure, the cathode material may include a bi-metal sulfide additive. As set forth in more detail below, the addition of the bi-metal sulfide additive to the cathode material (e.g., $FeO_4$, $FeS_2$ or $CoS_2$) results in improved cell performance.

As used herein, an "electrochemical device" may otherwise be referred to as a battery (and in some embodiments, a "thermal battery"), a capacitor, a cell, an electrochemical cell, or the like. It should be understood that these references are not limiting, and any device that involves electron transfer between an electrode and an electrolyte is contemplated within the scope of the present disclosure. Further, an electrochemical device may refer to single or multiple connected electrochemical devices, electrochemical cells, batteries or capacitors capable of supplying energy to a load, and none of the references herein to any particular device should be considered to limit the disclosure in any way.

In accordance with various embodiments of the disclosure, cathode materials for use in thermal batteries are prepared by consolidating powders via a mechanical pressing operation or other powder handling means, such as tape casting, to produce pellets (i.e., wafers). The pellets are then stacked in a desired arrangement to provide voltage and current when the battery is activated.

A primary active material for cathode is a metal oxide such as $FeO_4$ or a metal sulfide such as $FeS_2$, $CoS_2$ or mixtures thereof. In this regard, it should be understood that combinations of metal oxides and metal sulfides may be used in any relative proportion without limitation.

In accordance with the present disclosure, the primary active material may be combined with a secondary active material which is typically a bi-metal sulfide such as, for example, $CuFeS_2$, to enhance the conductivity, increase voltage, and/or lengthen the lifetime of batteries that include the cathode. The source of bi-metal sulfide material (e.g., $CuFeS_2$) may be a natural mineralogical source (e.g., chalcopyrite) or the bi-metal sulfide material may be synthetically produced by any of the methods known to those of skill in the art. The cathode material may also contain an amount of lithium such as $Li_2O$ to regulate the battery voltage (e.g., at least about 1 wt % or from about 1 wt % to about 5 wt % $Li_2O$).

The composition of the cathode material may vary in accordance with the desired cell application. Exemplary, non-limiting, compositions for cathode material are set forth below.

TABLE 1

Exemplary compositions for cathode material of embodiments of the present disclosure

| Component | Exemplary Wt % | Exemplary Wt % | Exemplary Wt % |
|---|---|---|---|
| First Metal Compound (e.g., a metal oxide or metal sulfide such as $Fe_3O_4$, $FeS_2$ or $CoS_2$) | 46-80 | 58-64 | 59-63 |
| Bi-Metal Sulfide (e.g., $CuFeS_2$) | 2-14 | 6-12 | 7-11 |
| Electrolyte Material (e.g., KCl—LiCl with MgO or KBr—LiBr—LiCl—LiF) | 20-40 | 25-32 | 28-30 |
| Lithiation Additive (e.g., $Li_2O$) | 0-5 | 0-3 | 0-2 |

In this regard, it should be noted that, more generally, the cathode material may contain, in various exemplary embodiments: at least about 46 wt % of the first metal compound (e.g., $FeO_4$, $FeS_2$ or $CoS_2$), at least about 50 wt %, at least about 55 wt %, at least about 60 wt %, at least about 65 wt %, at least about 70 wt % or even at least about 75 wt % of the first metal compound; at least about 2 wt % of the bi-metal sulfide (e.g., $CuFeS_2$), at least about 5 wt %, at least about 8 wt % or even at least about 11 wt % of the bi-metal sulfide; at least about 20 wt % of the electrolyte material, at least about 24 wt %, at least about 28 wt %, at least about 32 wt % or even at least about 36 wt % of the electrolyte material; and, optionally, at least about 1% lithiation additive or at least about 3 wt % lithiation additive. It is to be further noted that, in these or other exemplary embodiments, the cathode material may contain: no more than 80 wt % of the first metal compound, no more than about 14 wt % of the bi-metal sulfide, no more than about 40 wt % of the electrolyte material and, when present, no more than about 5 wt % of the lithiation additive. In addition, it is to be noted that, in one or more of the embodiments detailed herein, the concentration of a recited component may be within a range bounded by any combination or permutation of the higher and lower concentration limits noted herein (e.g., between about 2 wt % and about 14 wt % or between about 5 wt % and about 14 wt % of bi-metal sulfide), without departing from the intended scope of the present disclosure.

Furthermore, in this regard it should be noted that, since the cathode of the thermal batteries of the present disclosure typically contains flooded electrolyte, the components of the cathode material are typically expressed throughout the specification (e.g., as in Table 1 above and the proceeding paragraph) as a percentage of the total amount of active cathode materials, electrolyte materials and lithiation additives (if any). Additionally, or alternatively, it should also be understood that, in some embodiments, the cathode does not contain electrolyte material (e.g., only the anode contains flooded electrolyte) and/or does not contain lithiation additives. For instance, if the cathode materials of Table 1 above did not contain electrolyte or lithiation additive, the cathode materials may have the following exemplary, non-limiting compositions.

TABLE 2

Exemplary compositions for cathode material of embodiments of the present disclosure that do not contain electrolyte material or lithiation additives

| Component | Exemplary Wt % | Exemplary Wt % | Exemplary Wt % |
|---|---|---|---|
| First Metal Compound (e.g., a metal oxide or metal sulfide such as $FeO_4$, $FeS_2$ or $CoFeS_2$) | 76-98 | 83-91 | 84-90 |
| Bi-Metal Sulfide (e.g., $CuFeS_2$) | 2-24 | 9-17 | 10-16 |

In this regard, more generally in exemplary embodiments in which the electrode material does not contain electrolytes or lithiation additives, the cathode material may contain at least about 76 wt % of the first metal compound, at least about 80 wt %, at least about 85 wt %, at least about 90 wt % or at least about 95 wt % of the first metal compound. In these and other embodiments, the cathode material may contain at least about 2 wt % bi-metal sulfide, at least about 5 wt %, at least about 10 wt %, at least about 15 wt % or even at least about 20 wt % bi-metal sulfide. It should be further noted that, in these and other exemplary embodiments, the cathode material may contain no more than about 98 wt % of the first metal compound and may contain no more than about 24 wt % of the bi-metal sulfide. As expressed above, the concentration of a recited component may be within a range bounded by any combination or permutation of the higher and lower concentration limits noted herein without limitation.

Accordingly, in these or in other embodiments in which the cathode material does not contain electrolyte material or lithiation additives, the cathode material may consist of the recited components (e.g., the first metal compound and bi-metal sulfide) or, alternatively, consist essentially of these components (i.e., may include other compounds but exclude electrolyte materials, lithiation additives and all other active cathode materials). Further, in embodiments described above in which the cathode material includes a first metal compound, a bi-metal sulfide, electrolyte material and, optionally, lithiation additives, the cathode material may consist of these compounds or, alternatively, consist essentially of these compounds (e.g., exclude active cathode compounds other than the first metal compound and the bi-metal sulfide).

An electrolyte that is suitable to flood the cathode and enable longer life from the cell may be prepared by mixing the salts, for example, potassium chloride (KCl) and lithium chloride (LiCl) eutectic, with a binder material such as MgO and fusing the salts above their liquidus temperature (e.g., at least about 500° C. or even at least about 650° C.). The fused salt-binder mixture is ground and sieved to restrict the particle size distribution. Generally, the size of the particles of the electrolyte material is not critical; however, the particle size should be consistent with typical battery manufacturing operations as dependent on the battery design as appreciated by those of skill in the art. For example, tape casting methods generally use smaller particles than pellet pressing methods. When pellet pressing methods are used to form the electrolyte material (such as when the electrolyte material is used to flood a cathode or anode), the electrolyte particles should be screened such that they are sufficiently small to allow proper filling of the die but yet large enough such that they do not infiltrate the gap between the punch and the die. In tape casting methods, the particles should be sufficiently small to allow casting of a thin tape. Suitable particle size ranges may be readily determined by those of skill in the art.

The starting salt materials may be either in powder or granulated form and are preferably dried at a temperature sufficient to remove an amount of absorbed moisture (if any). Moisture may be removed as much as economically practical and as much as practical in view of the selected manufacturing process. Generally, the amount of moisture should be reduced to an amount that does not cause an unacceptable amount of anode material oxidation. In some embodiments of the present disclosure, the electrolyte salt material may be heated, for example to a temperature of from about 100° C. to about 400° C., to remove moisture from the material.

If desired, a lithiation additive, such as lithium oxide ($Li_2O$) may be added to the electrolyte material to provide voltage regulation by limiting the peak voltage of the cell.

In preparing the battery components, the constituents (e.g., electrolyte salts, first metal compound and bi-metal sulfide) are weighed out in the appropriate ratio, such as ratios consistent with compositions described above, and mixed to obtain a homogeneous powder. The first metal compound and bi-metal sulfide may be added directly to the electrolyte salt material or, alternatively, the first metal compound and bi-metal sulfide may first be combined and mixed and then added and mixed with the electrolyte material. Physical mixing may proceed via any mechanical mixing method, for example, stirring the salts by hand, agitating the ingredients in a Turbula blender, rolling the container on a jar mill, or the like. Mixing may proceed from 15 minutes to 2 hours, depending on the total amount of salt and the manner of mixing.

As disclosed in U.S. Pat Pub. No. 2010/0310917, filed Apr. 5, 2010, entitled "Thermal Battery Electrolyte Materials, Electrode-Electrolyte Composites, and Batteries Including Same," which claims the benefit of U.S. Provisional No. 61/167,040, filed Apr. 6, 2009, which are both incorporated herein for all relevant and consistent purposes, in addition to preparing cathodes using the additive in concert with traditional electrolytes to provide flooding, an additional formulation using a substantially binder-free electrolyte (that is, containing substantially no MgO or other binding agent) may be incorporated into the cathode material to provide additional cathode performance improvement in concert with the bi-metal sulfide (e.g., $CuFeS_2$) additive. This substantially binder-free electrolyte may be used as a replacement for the binder-containing electrolyte conventionally used in thermal batteries, such as a KCl—LiCl eutectic electrolyte material.

In this regard it is to be noted that, as used herein, a "binderless" electrolyte material (or, alternatively, an electrolyte material "substantially binder-free") generally refers to an electrolyte that contains essentially no conventional binder (e.g., MgO, fumed silica or clay minerals such as kaolinite. For example, in various embodiments, the electrolyte material may contain less than about 5 wt % binder, less than about 3 wt %, less than about 1 wt %, less than about 0.1 wt % or even no amount of binder (based on the total weight of the electrolyte material). Alternatively or in addition, the sum of the concentrations of the electrolyte material components (e.g., lithium bromide, lithium chloride, lithium fluoride, and optionally potassium bromide) may be at least about 95 wt %, at least about 96 wt %, at least about 97 wt %, at least about 98 wt %, at least about 99 wt % or even about 100 wt % (based on the total weight of the electrolyte material). Accordingly, in these or other embodiments, the electrolyte material may consist, or alternatively consist essentially of, the recited components (the electrolyte material being, for example, a ternary mixture of essentially three components, or a quaternary mixture of essentially four components).

Various exemplary substantially binder-free electrolyte materials, in accordance with various embodiments of the disclosure, include a salt mixture of lithium bromide (LiBr), lithium chloride (LiCl), lithium fluoride (LiF), and optionally potassium bromide (KBr). The ratio of the three or four salts may vary, with preferred embodiments being in the ranges shown below.

TABLE 3

Exemplary compositions for electrolyte materials

| Component | Exemplary Wt % | Exemplary Wt % | Exemplary Wt % | Exemplary Wt % |
|---|---|---|---|---|
| KBr | 0-12 | 1-9 | 1-3 | 9-12 |
| LiBr | 25-41 | 25-41 | 30-38 | 32-39 |
| LiCl | 4-14 | 4-14 | 9-12 | 5-7 |
| LiF | 42-64 | 42-64 | 50-60 | 42-53 |

In this regard it is to be noted that, more generally, the electrolyte material may contain, in various exemplary embodiments: at least about 25 wt % lithium bromide, at least about 30 wt %, at least about 35 wt %, or even at least about 40 wt % lithium bromide; at least about 4 wt % lithium chloride, at least about 6 wt %, at least about 8 wt %, at least about 10 wt %, or even at least about 12 wt % lithium chloride; at least about 42 wt % lithium fluoride, at least about 45 wt %, at least about 50 wt %, at least about 55 wt %, or even at least about 60 wt % lithium fluoride; and, optionally, at least about 1 wt % potassium bromide, at least about 2 wt %, at least about 4 wt %, at least about 8 wt %, or even at least about 10 wt % potassium bromide. It is to be further noted that, in these or other exemplary embodiments, the electrolyte material may contain: no more than about 41 wt % lithium bromide; no more than about 14 wt % lithium chloride; no more than about 64 wt % lithium fluoride; and, when present, no more than about 12 wt % potassium bromide. Finally, it is to be noted that, in one or more of the embodiments detailed herein, the concentration of a recited component may be within a range bounded by any combination or permutation of the higher and lower concentration limits noted herein (e.g., between about 25 wt % and about 41 wt %, or between about 30 wt % and about 41 wt % lithium bromide), without departing from the intended scope of the present disclosure.

In preparation of the cathode materials for use in the cathode, the metal sulfides and/or metal oxides and the bi-metal sulfides may be purified (if needed) using water and acid washing techniques and magnetic screening to remove impurities, and as desired may be passed through a sieve to limit the particle size to some specified range. As described above in regard to the electrolyte salts, the particle size of the cathode material should be selected to be consistent with the cell manufacturing methods of use (e.g., tape casting or pellet pressing) and moisture should be removed until a level of moisture that does not cause an unacceptable amount of cell oxidation is achieved. If using powder pressing for preparation of the cathode material, the mixed powder is weighed and introduced into a die and consolidated using a uniaxial mechanical pressing process. While the data presented in the Examples below is for materials tested using pressed powder pellets, the application of this material is also possible via means such as tape casting or other consolidation methods to prepare components for thermal batteries.

Once the pressed components are consolidated into pellets, thermal batteries may be prepared by assembling in stacks the various components including the anode 102, electrolyte-separator 104, and cathode 106, plus a heat source pellet 108 if applicable to the particular battery design. Assembly of one each of anode 102, electrolyte-separator 104, and cathode 106 comprises a single cell. Multiple cells may be stacked in series to produce a thermal battery. In this regard it should be understood that thermal battery designs other than as shown in FIG. 1 may be used without departing from the scope of the present disclosure.

EXAMPLES

The following examples illustrate the utility of the new cathode formulation from comparative data of single cell tests. The following non-limiting examples set forth below are illustrative of various aspects of certain exemplary embodiments of the present disclosure. The compositions, methods and various parameters reflected therein are intended only to exemplify various aspects and embodiments of the disclosure, and are not intended to limit the scope of the claimed disclosure.

FIG. 1 shows a stack arrangement of a thermal battery, including heat pellet 108 that would be used to melt the electrolyte upon battery activation. This arrangement, without heat pellet 108, was used for the single cell tests discussed in the Examples below.

Example 1

Figure 2:
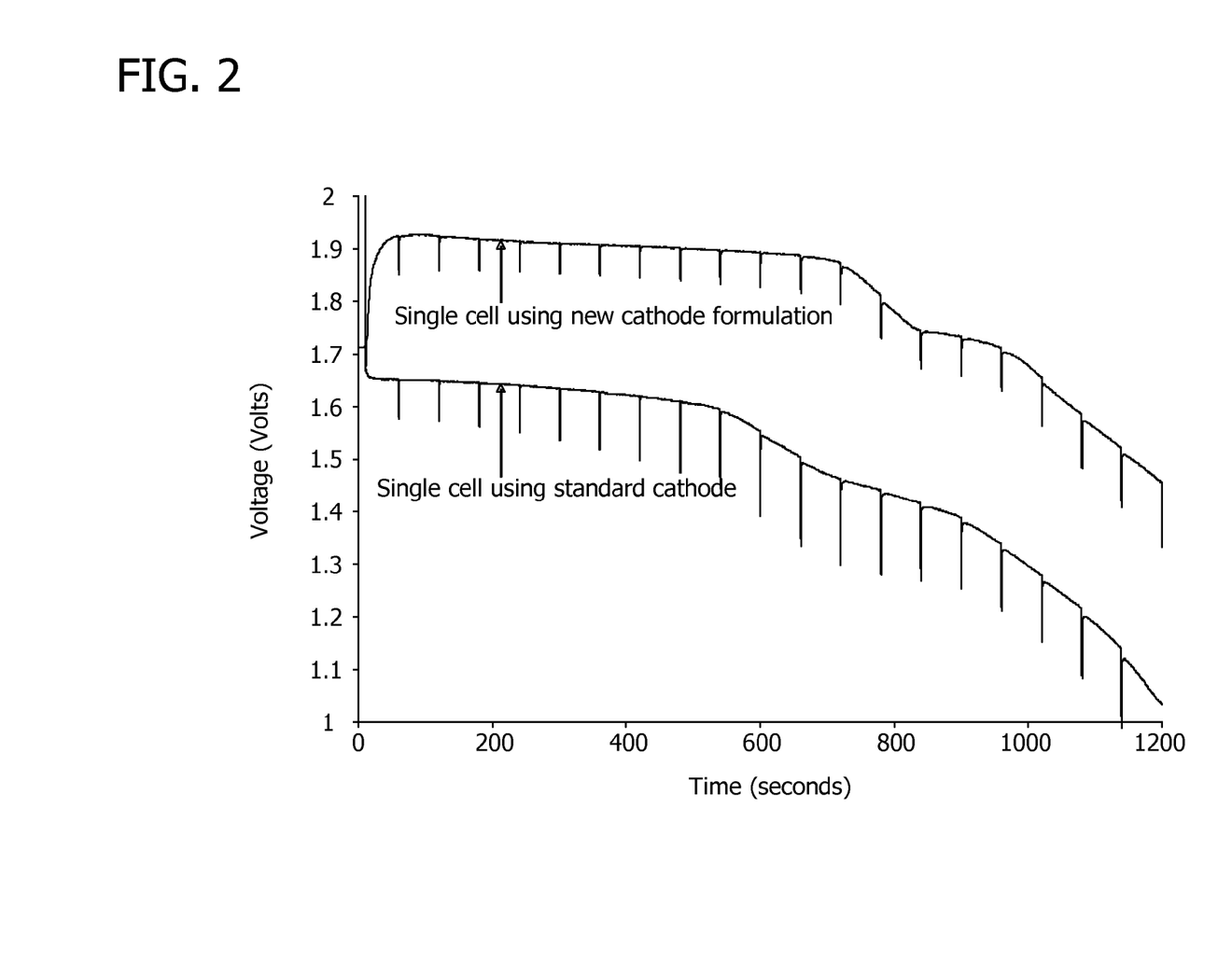
FIG. 2 illustrates a voltage trace diagram of a thermal battery cell in accordance with a first embodiment of the disclosure and a trace diagram of a conventional cell.
Figure 3:
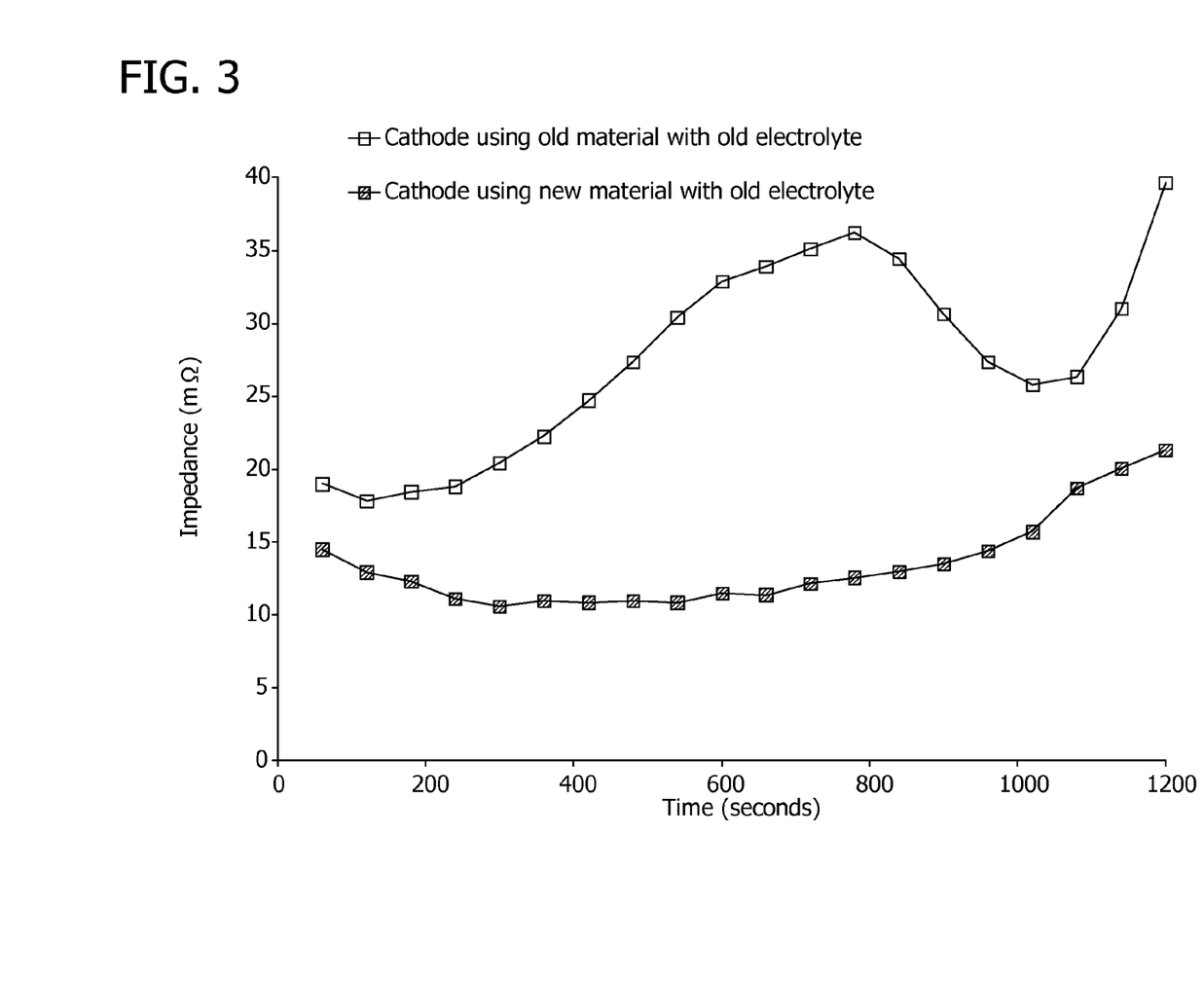
FIG. 3 illustrates an impedance trace of a thermal battery cell in accordance with the first embodiment of the disclosure and a conventional cell.

Voltage Traces and Impedance for Cells having Non-Lithiated $FeS_2$ Cathodes with and without $CuFeS_2$ FIG. 2 illustrates voltage traces for two thermal single cells tested at 500° C., applying a 1 ampere base load with 5 ampere pulses applied every 60 seconds for a 1 second duration. The first single cell included a lithium-silicon alloy anode flooded with KCl—LiCl eutectic electrolyte, a LiBr—LiCl—LiF electrolyte-separator bound with MgO, and a cathode containing primarily $FeS_2$ (about 63% by weight) with synthetic $CuFeS_2$ (about 7% by weight) additive that is flooded with MgO-bound KCl—LiCl eutectic electrolyte making up the remaining 30% by weight of the cathode pellet. The second thermal single cell contained the same anode and electrolyte materials, but used a cathode containing only $FeS_2$ (70% by weight) flooded with the same MgO-bound electrolyte, hereafter referred to as the "standard cathode." The voltage of the standard cathode was modified (each data point was subtracted by 0.25 volts) to illustrate the performance of the two cells by avoiding overlap of the voltage traces. FIG. 3 shows the impedance of the single cells from the tests shown in FIG. 2. In FIG. 3, the open symbols are for the single cell using the standard cathode, while the solid symbols are for the single cell using the $FeS_2$—$CuFeS_2$ cathode formulation of the present disclosure. The impedance was computed using:

$$\text{impedance} = -\frac{\Delta V}{\Delta i} = -\frac{V_{Base}}{i_{Pulse}} - \frac{V_{Pulse}}{i_{Base}}$$

where $V_{Base}$ is the last voltage data under the base load of 1 ampere prior to application of a pulse, $V_{pulse}$ is the first data point after application of the 5 ampere pulse, $i_{Base}$ and $i_{Pulse}$ are the corresponding data points for the current draw for which the $V_{Base}$ and $V_{pulse}$ data points were collected. As illustrated in FIG. 3, the incorporation of the synthetic $CuFeS_2$ additive, keeping all other components (anode, electrolyte-separator) the same results in a significant improvement in performance compared to the standard cathode.

Example 2

Figure 4:
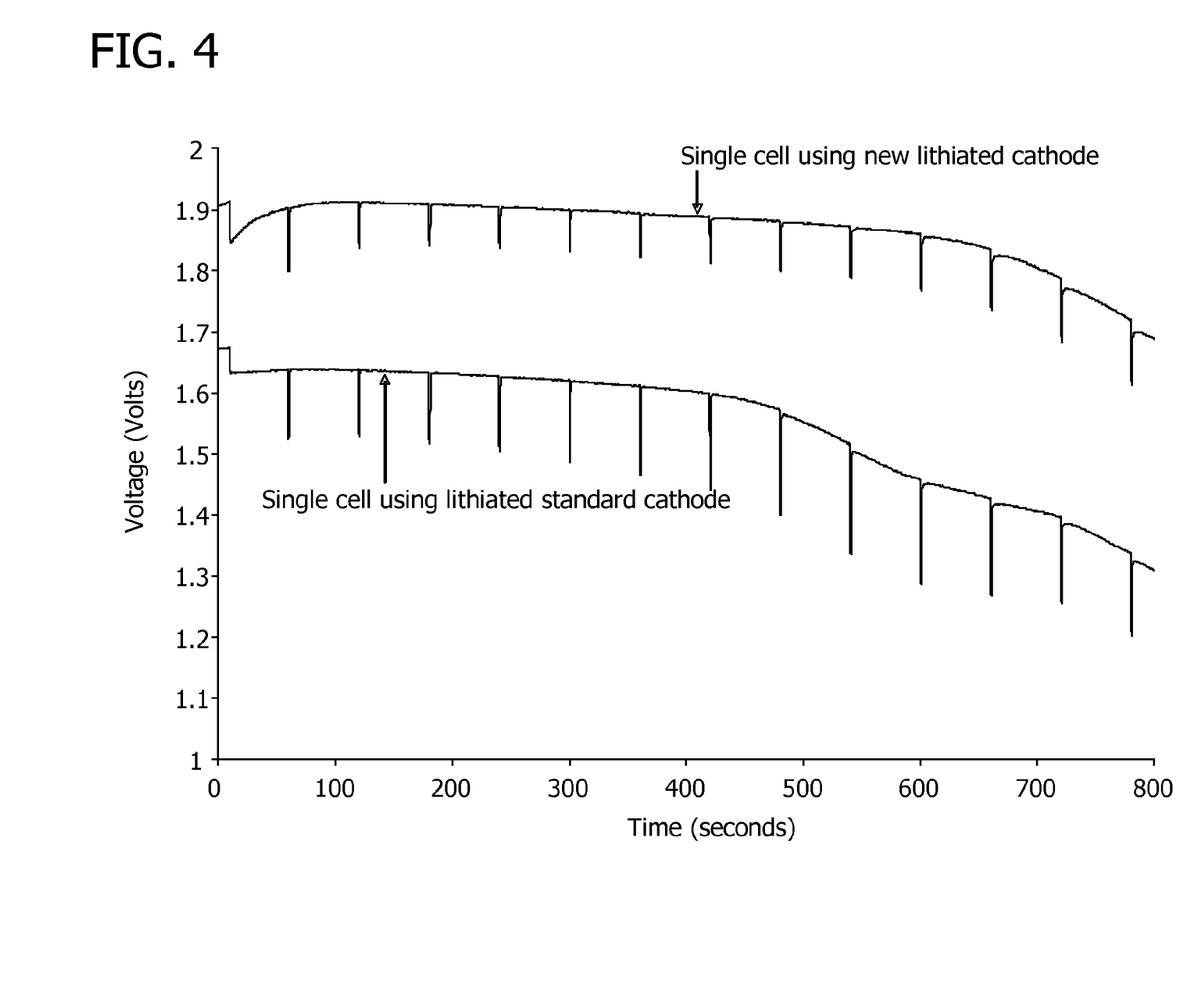
FIG. 4 illustrates a voltage trace of a thermal battery cell in accordance with a second embodiment of the disclosure and a conventional cell.

Voltage Traces and Impedance for Cells having Lithiated $FeS_2$ Cathodes with and without $CuFeS_2$ FIG. 4 illustrates a voltage trace for a cathode substantially the same as the standard cathode of Example 1, but with addition of a lithiating additive (lithium oxide, $Li_2O$) such that the composition of the "lithiated standard cathode" is about 70 wt % $FeS_2$, about 2 wt % $Li_2O$, and about 28 wt % MgO-bound KCl—LiCl eutectic electrolyte. The voltage of the lithiated standard cathode was modified (each data point was subtracted by 0.25 volts) for illustration purposes. FIG. 4 also illustrates a voltage trace for a single cell comprised of the same anode and electrolyte-separator pellet materials described in Example 1, but using a cathode formulation containing $FeS_2$ (about 58% by weight), naturally-occurring $CuFeS_2$ (about 10% by weight), $Li_2O$ (about 2% by weight), and a substantially binder-free electrolyte containing KBr, LiBr, LiCl, and LiF (about 30% by weight). The amount of each salt in the electrolyte material was 10.4 wt % KBr, 35.5 wt % LiBr, 6.4 wt % LiCl and 47.7 wt % LiF.

Figure 5:
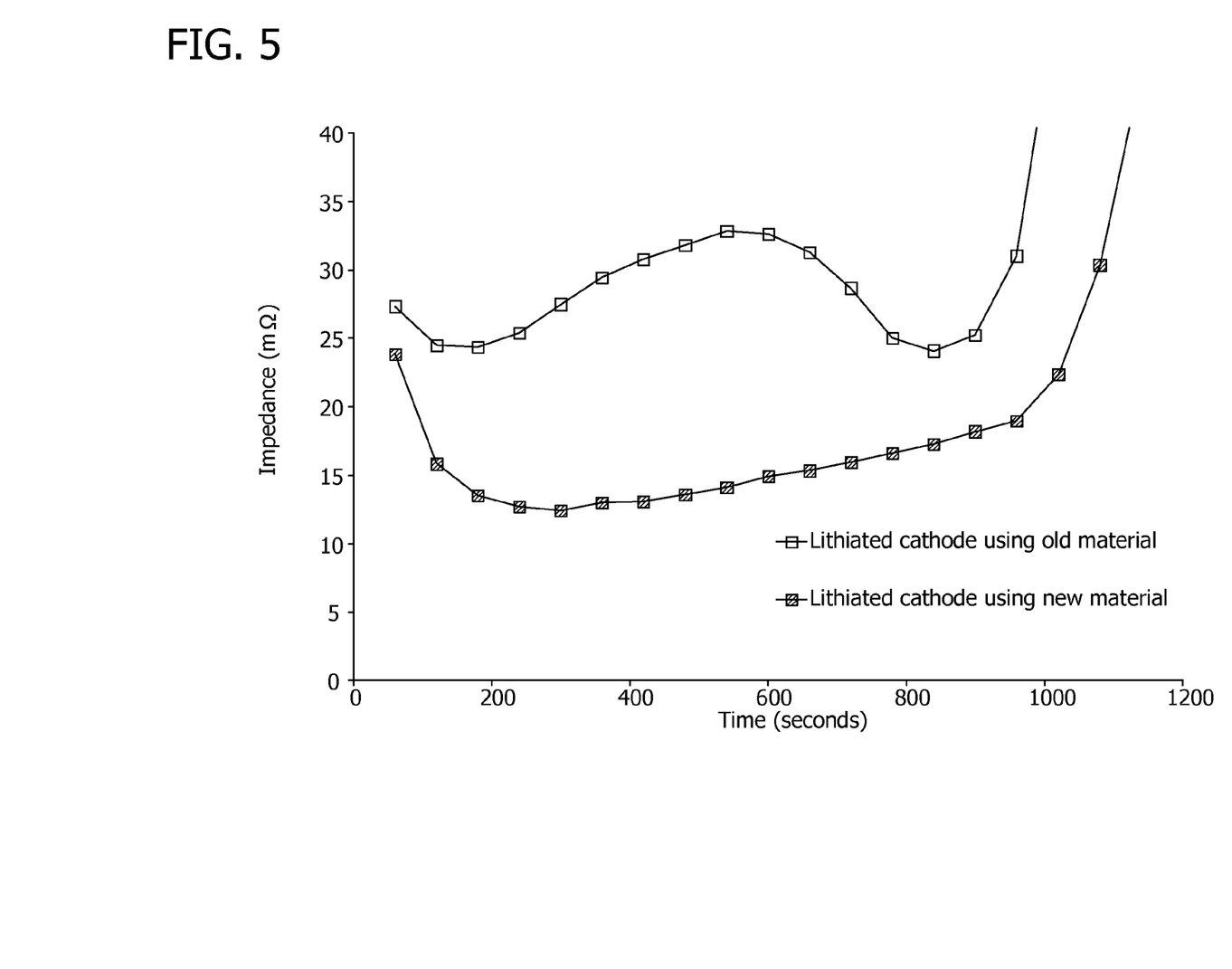
FIG. 5 illustrates an impedance trace of a thermal battery cell in accordance with the second embodiment of the disclosure and a conventional cell.

FIG. 5 shows the impedance traces for the single cells of FIG. 4. The open symbols are the data for the single cell using the lithiated standard cathode, while the solid symbols represent the new cathode formulation. Different electrolytes and lithiation additives (including the absence thereof) may be used with the new cathode additive, regardless of whether the additive is naturally-occurring or synthetic $CuFeS_2$.

As can be seen from FIG. 4, the voltage of the new lithiated cell is sustained and does not "roll-off" until much later in the test as compared to the standard cathode. As can be seen from FIG. 5, the new cell has a lower impedance over the entire test as compared to the standard cell.

Example 3

Voltage Traces and Impedance for Cells having $CoS_2$ Cathodes with and without $CuFeS_2$ The test of Example 1 was repeated with $CoS_2$-based cathodes. One cathode contained $CoS_2$ (about 56% by weight) with synthetic $CuFeS_2$ (about 14% by weight) additive flooded with MgO-bound KCl—LiCl eutectic electrolyte making up the remaining 30% by weight of the cathode pellet. The other cathode contained only $CoS_2$ (70% by weight) flooded with MgO-bound electrolyte (30% by weight).

Figure 6:
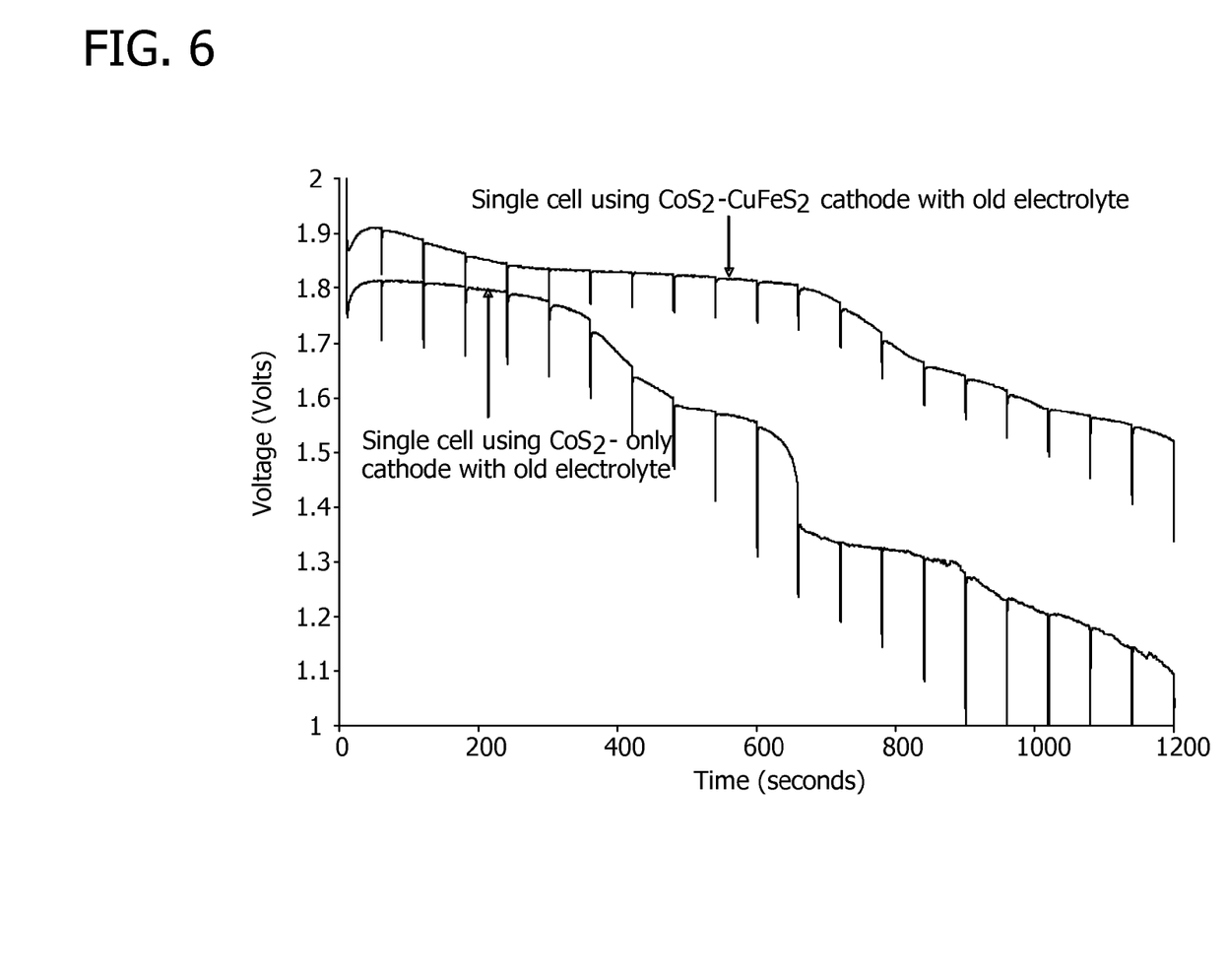
FIG. 6 illustrates a voltage trace of a thermal battery cell formed in accordance with a third embodiment of the disclosure and a conventional cell.
Figure 7:
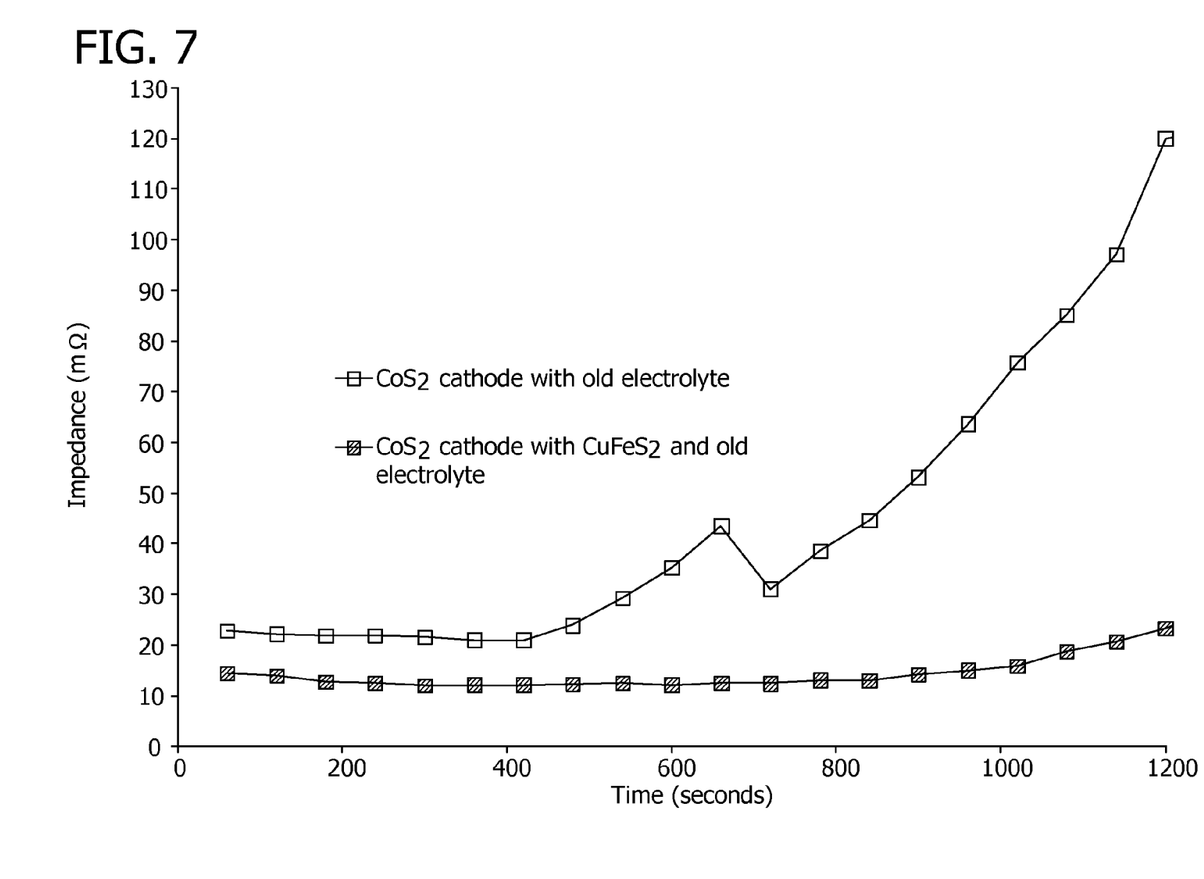
FIG. 7 illustrates an impedance trace of a thermal battery cell in accordance with the third embodiment of the disclosure and a conventional cell.

FIG. 6 illustrates voltage traces for the two cells (neither one being off-set) and FIG. 7 shows the impedance of the single cells. The open symbols are the data for the single cell using the standard cathode, while the solid symbols represent the new $CoS_2$—$CuFeS_2$ cathode formulation. As can be seen in FIGS. 6 and 7, the cathode containing $CuFeS_2$ additive exhibited superior voltage and impedance characteristics.

Various principles of the disclosure have been described in illustrative embodiments. However, many combinations and modifications of the above described formulations, proportions, elements, materials, and components used in the practice of the disclosure, in addition to those not specifically described, may be varied and particularly adapted to specific environments and operating requirements without departing from those principles. Other variations and modifications of the present disclosure will be apparent to those of ordinary skill in the art, and it is the intent that such variations and modifications be covered by this disclosure.

Further, the description of various embodiments herein makes reference to the accompanying drawing figures, which show the embodiments by way of illustration and not of limitation. While these embodiments are described in sufficient detail to enable those skilled in the art to practice the disclosure, it should be understood that other embodiments may be realized and that logical and mechanical changes may be made without departing from the spirit and scope of the disclosure. Thus, the disclosure herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the claims that may be included in an application that claims the benefit of the present application, in which reference to an element in the singular is not intended to mean "one and only one" unless explicitly so stated, but rather "one or more." Moreover, where a phrase similar to "at least one of A, B, and C" may be used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although certain embodiments may have been described as a method, it is contemplated that the method may be embodied as computer program instructions on a tangible computer readable carrier and/or medium, such as a magnetic or optical memory or a magnetic or optical disk. All structural, chemical, and functional equivalents to the elements of the above-described embodiments are contemplated within the scope of this disclosure.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatus and methods without departing from the scope of the disclosure, it is intended that all matter contained in the above description and shown in the accompanying figures shall be interpreted as illustrative and not in a limiting sense.

What is claimed is:

1. A cathode material for use in thermal batteries, the cathode material comprising:
 a metal sulfide that is at least 46 wt % selected from the group consisting of $FeS_2$, $CoS_2$ and mixtures thereof;
 at least 2 wt % and no more than 14 wt % $CuFeS_2$; and
 an amount of electrolyte material.

2. The cathode material as set forth in claim 1, further comprising:
 no more than 80 wt % of the metal sulfide.

3. The cathode material as set forth in claim 1, the cathode material further comprising:
 at least 6 wt % $CuFeS_2$.

4. The cathode material as set forth in claim 1, wherein the electrolyte material includes:
 at least 25 wt % lithium bromide;
 at least 4 wt % lithium chloride;
 at least 42 wt % lithium fluoride; and
 at least 1 wt % potassium bromide.

5. The cathode material as set forth in claim 1, wherein at least 76 wt % of the metal sulfide is selected from the group consisting of $FeS_2$, $CoS_2$ and mixtures thereof.

6. The cathode material as set forth in claim 5, the cathode material further comprising:
 at least 9 wt % $CuFeS_2$.

7. The cathode material as set forth in claim 1 wherein the $CuFeS_2$ is synthetic or is obtained from chalcopyrite.

8. The cathode material as set forth in claim 1, further comprising:
 metal oxide that is at least 1 wt % $Li_2O$.

9. A battery comprising an anode material, a cathode material, and an electrolyte material, the cathode material comprising:
 a metal sulfide that is at least 46 wt % selected from the group consisting of $FeS_2$, $CoS_2$ and mixtures thereof;
 at least 2 wt % and no more than 14 wt % $CuFeS_2$; and
 an amount of electrolyte material.

10. The battery as set forth in claim 9, the cathode material further comprising:
 no more than 80 wt % of the metal sulfide.

11. The battery as set forth in claim 9, the cathode material further comprising:
 at least 6 wt % $CuFeS_2$.

12. The battery as set forth in claim 9 wherein the $CuFeS_2$ is synthetic or is obtained from chalcopyrite.

13. The battery as set forth in claim 9 further comprising:
 a second electrolyte material included within the cathode, wherein the second electrolyte material includes:
 at least 25 wt % lithium bromide;
 at least 4 wt % lithium chloride;
 at least 42 wt % lithium fluoride; and
 at least 1 wt % potassium bromide.

14. The battery as set forth in claim 13 wherein the second electrolyte material is substantially binder-free.

15. The battery as set forth in claim 13 wherein the second electrolyte material is substantially MgO-free.

16. The battery as set forth in claim 13 wherein the lithium bromide, lithium chloride, lithium fluoride and potassium bromide form a eutectic mixture.

17. The battery as set forth in claim 13 wherein the second electrolyte material includes:
 no more than 41 wt % lithium bromide;
 no more than 14 wt % lithium chloride;
 no more than 64 wt % lithium fluoride; and
 no more than 12 wt % potassium bromide.

18. The battery as set forth in claim 9, further comprising:
 metal oxide that is at least 1 wt % $Li_2O$.

19. The battery as set forth in claim 9 wherein the battery is a thermal battery and comprises pyrotechnic material.

* * * * *